United States Patent
Wheeler

[15] 3,670,446
[45] June 20, 1972

[54] WEEDLESS HOOK AND LURE

[72] Inventor: Daniel B. Wheeler, 271 Remsen Ave., New Brunswick, N.J. 08901

[22] Filed: April 7, 1970

[21] Appl. No.: 26,310

[52] U.S. Cl. ............................ 43/42.19, 43/42.43, 43/42.4, 43/42.2, 43/43.4, 43/43.6
[51] Int. Cl. ........................................................ A01k 85/00
[58] Field of Search ................... 43/42.43, 42.4, 42.52, 43.2, 43/43.6, 42.19, 44.98, 43.4, 43.6, 42.2, 42.42

[56] References Cited

UNITED STATES PATENTS

| 2,549,458 | 4/1951 | Grimm | 43/42.4 |
| 797,281 | 8/1905 | Henzel | 43/43.6 |
| 2,538,052 | 1/1951 | Schwarzer | 43/42.43 X |
| 2,157,414 | 5/1939 | Johnson | 43/42.43 X |
| 3,043,045 | 7/1962 | Martuch | 43/44.98 |
| 3,512,294 | 5/1970 | Howald | 43/44.98 |
| 2,219,225 | 10/1940 | Gambill | 43/42.4 X |
| 1,934,158 | 11/1933 | Yarvice | 43/42.52 |

*Primary Examiner*—Melvin D. Rein

[57] ABSTRACT

An improved fishing tackle comprising a weedless hook incorporating a flexible guard with braided filament core and an outer skin or coating of plastic, having an end thereof receivable over a hook tip and a lure comprising a weedless spinner, the spinner being fixed whereby a fish may not be able to set off the weed guard thus slipping the end thereof off the hook tip.

6 Claims, 10 Drawing Figures

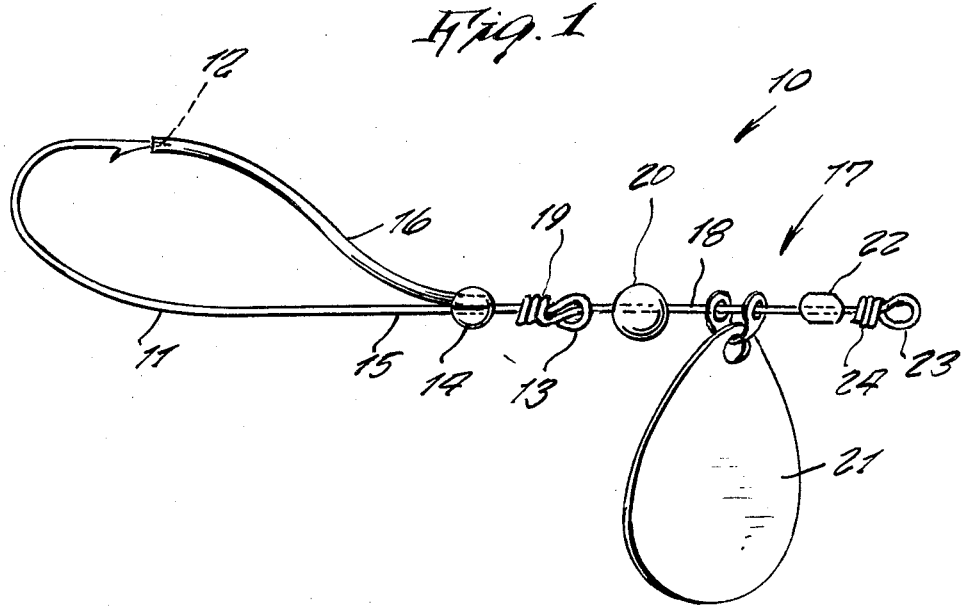

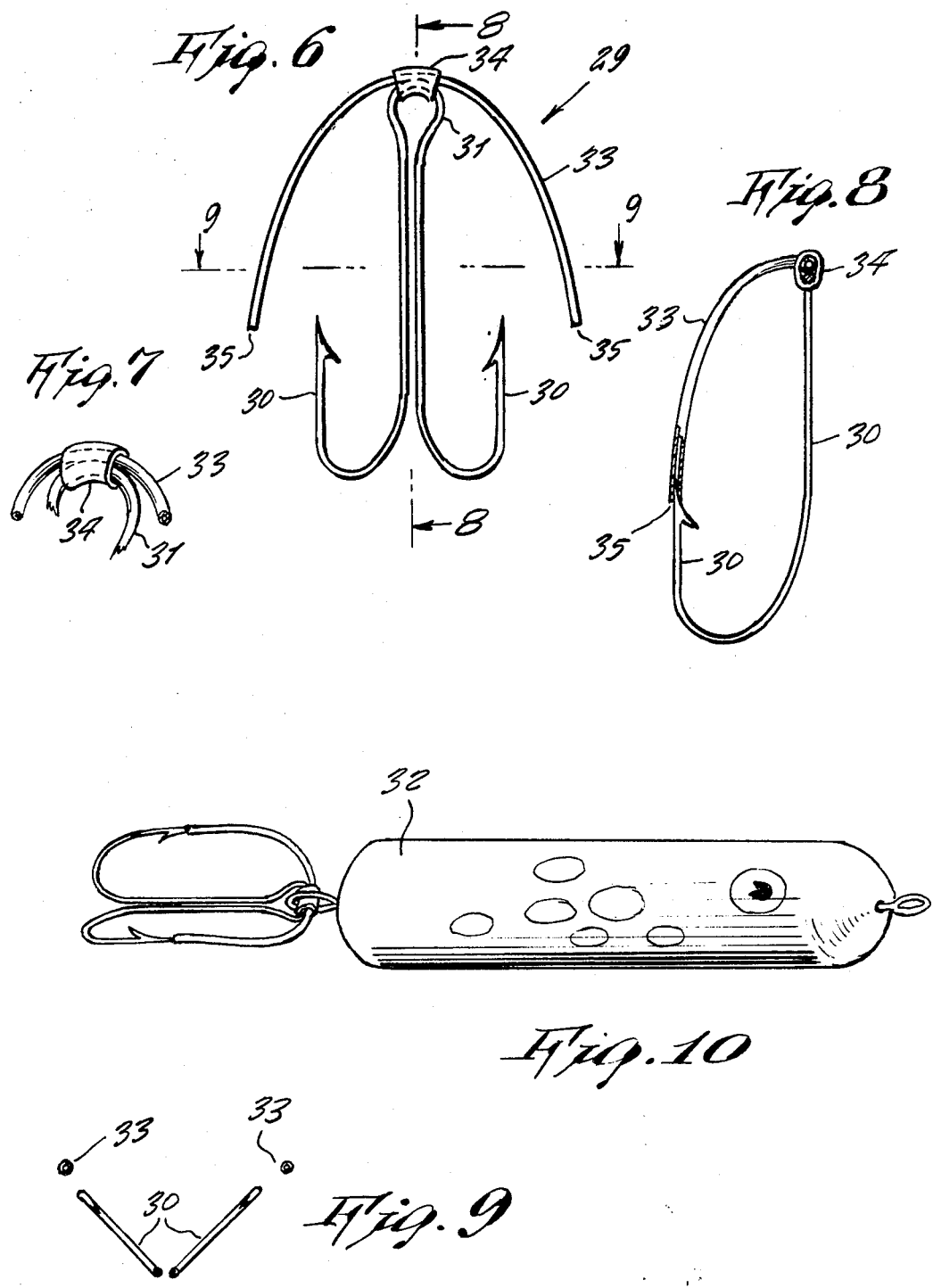

WEEDLESS HOOK AND LURE

This invention relates generally to fishing hooks and lures. More specifically it relates to weedless hooks and lures.

A principle object of the present invention is to provide an improved weedless hook that may be combined with a weedless spinner and which incorporates self-contained means whereby a fish is able to set off a weed guard that normally protects the hook tip from snagging upon weeds.

Another object of the present invention is to provide a weedless hook and lure wherein the spinner is fixed on an extending wire shaft secured to the loop end of a hook where the spinner will not interfere with the normal operation of a guard or the hook tip.

Yet a further object is to provide a weedless hook and lure wherein the spinner may comprise a spinning blade or a revolving propeller-type double spoon.

Other objects of the present invention are to provide a weedless hook and lure which is simple in design, inexpensive to manufacture, rugged in construction, easy to use and efficient in operation.

These and other objects will become readily evident upon a study of the following specification and the accompanying drawing wherein:

FIG. 1 is a side elevation view showing one form of the present invention incorporating a split bead metal collar and a spinner, FIG. 2 is a fragmentary side elevation view showing a modified form of the invention wherein a propeller-type spoon is used instead of the spinner, FIG. 3 is a side elevation view showing a modified form of the present invention which incorporates a rubber collar and inter-connecting wire instead of a split bead, and FIG. 4 is a side elevation view showing a modified form of the present invention wherein a wrapping of wire or thread is used instead of a collar; and FIG. 5 is an enlarged detail view of the guard;

FIG. 6 is a front elevation view of a weedless double hook shown incorporating the present invention;

FIG. 7 is an enlarged perspective view of a detail thereof;

FIG. 8 is a cross-sectional view on line 8—8 of FIG. 6;

FIG. 9 is a cross-sectional view on line 9—9 of FIG. 6; and

FIG. 10 is a perspective view of the invention attached to a lure and shown in operative use.

Referring now to the drawing in detail, and more particularly to FIG. 1 at this time, the reference numeral 10 represents a weedless hook and lure, according to the present invention wherein there is a conventional fish hook 11 having a barbed tip 12 at one end thereof, the opposite end of the hook 11 being bent over to form a loop 13 that is conventionally used for attachment to a fishing line.

In the present invention a collar 14 is mounted upon the shank 15 of the fish hook 11, the collar 14 rigidly securing one end of a guard 16. Guard 16 comprises a tubular shaped member made of a braided filament core that is covered on its outer side with a plastic coating, and which is semi-flexible so that it can be dislodged from a set position by a fish. In a set position, the opposite end of the guard is fitted over the hook tip 12, as shown in FIG. 1.

The present invention also incorporates an improved lure in conjunction with the weedless hook and which will not interfere with the normal operation of the guard 16. The lure 17 incorporates a wire shaft 18, one end of which is inserted through the loop 13 of the fish hook 11, and the terminal end thereof is wrapped around the hook shank 15, as shown at 19, thus providing a rigid securement to the hook.

A bead 20 which may be of any desired size from small to relatively large, is slidably fitted upon the wire shaft 18 and a spinner 21 is then secured upon the wire shaft, as shown. A spacer 22 is fitted upon the wire shaft 18 between the spinner and the terminal end of the wire shaft, the terminal end of the wire shaft being then bent over to form a loop 23 while the terminal end of the wire is wrapped as shown at 24 around the wire shaft 18.

It will not be readily evident that in operative use the spinner will not interfere with dislodging the guard 16 from the hook tip 22 due to being spaced a sufficient distance therefrom, such a provision being made possible by the extending wire shaft 18 from which the spinner is supported.

Thus while moving the hook and lure through the weeds, the hook will not get snagged upon the same. However, in case of a strike by a fish, the sufficiently flexible plastic guard 16 will readily slip off the end 12 of the hook thus exposing the hook tip and barb for catching the fish.

In FIG. 2, a modified form of the present invention is identical except that a propeller type double spoon 25 is used in substitution of the spinner 21, all other remainder of the structure being identical as shown in FIG. 1.

In FIG. 3, a further modified form of the present invention is shown wherein, instead of a split bead 14, a rubber collar 26 is mounted upon the hook shank 15, the rubber collar having one end of an interconnecting wire 27 attached thereto, while the opposite end of the inter-connecting wire is secured within the opposite end of the plastic guard 16.

In FIG. 4 of the drawing, a further modified form of the present invention is shown wherein, instead of a metal collar 14 or a rubber collar 26, there is provided a wrap 28 made either of wire or thread, the wrapping serving to enjoin one end of the plastic guard 16 securely around the hook shank 15.

All attaching methods 14, 26, 28 thus made and described are movable upon the shank 15 and adjustable to fit guard 16 to the hook tip 12.

Referring now to FIGS. 6 to 10, the present invention is shown applied to a weedless double hook 29 which is formed from a single wire having a hook 30 at each opposite end, the wire having an eye 31 at its center for attachment to a plug, spoon, spinner or lure 32 as shown in FIG. 10.

A length of braided fly fishing line 33 is attached at its midportion to the loop 31, by means of a short length of plastic or rubber tubing 34, through which the double hook wire and the braided fly fishing line 33 have been inserted, as shown in greater detail in FIG. 7. The line 33 has openings 35 at its opposite ends and into which the pointed ends of both hooks are receivable, as shown in FIGS. 8 and 10.

In constructing this weedless double hook, the flyline is inserted into the tube first, after which one point of the hook is then inserted through the tube; the tube then being brought to the eye 31. It is to be noted that the length of the tube is approximately half the circumference of the eye 31, and the length of the flyline is sufficient to reach both hook tips.

This hook can replace the treble hooks normally used on lures, spoons, plugs or spinners, and can be sold in such combinations.

Thus there has been provided a weedless hook and lure and wherein the lure will not in any way interfere with normal operation of a guard of the weedless hook. It is, of course, understood that the present invention incorporates two distinct invention features, one of which comprises the weedless hook with braided or interwoven filament guard, and the other of which comprises the novel lure secured to the end of the fish hook and extending away so that the lure does not interfere with the hook tip.

What I now claim is:

1. In a weedless hook, the combination of a barbed tip at one end adjacent an arcuate portion of said hook, a straight shank portion adjacent an opposite end of said portion with a terminal end of said shank portion being bent to form a loop, and a guard consisting of a tubular shaped member made of a braided filament core covered by a plastic coating forming a protecting member for said barbed tip, a terminal end of said tip being receivable into one end of said tubular guard, so that said barbed tip is fitted into said braided filament core, and the opposite end of said guard being secured along a side of said shank portion of said hook at a point relatively close to said formed loop.

2. The combination as set forth in claim 1, wherein said hook comprises a double hook having said hook at each end thereof and an eye formed at its center for securement to a plug, spoon, spinner or other lure, said protecting guard comprising a length of braided fly fishing line secured at its mid portion to said eye of said double hook by means of a collar of metal, plastic or rubber.

3. The combination as set forth in claim 2, wherein said protecting guard is secured at its midportion to said eye of said double hook by means of a short length of rubber or plastic tubing through which said fly line and the wire of said double hook are inserted thus forming an elongated collar.

4. In an improved fishing lure, the combination of a straight wire shaft inserted at one end through an eye of a fish hook, said fish hook having a shank with said eye at one end thereof and an opposite arcuate portion which terminates in a barbed tip, said end of said wire shaft being wrapped around said shank portion of said hook, a bead slideably fitted upon said wire shaft, an attractor of spinner or propeller type being mounted pivotally free on said wire shaft, and the opposite end of said wire shaft receiving a spacer, the terminal end of said wire shank being configured into a loop and the terminal end thereof being wrapped around said wire shaft between said spacer and said loop, said hook including a protecting member or weed guard consisting of a tubular shaped member made of a braided filament core covered by a plastic coating, a terminal end of said barbed tip being receivable into one end of said tubular guard so that said tip is fitted within said braided filament core, and the opposite end of said guard being secured alongside said shank portion of said hook at a point relatively close to said hook eye.

5. The combination as set forth in claim 4, wherein said protecting member is secured to said shank portion of said hook by means of a collar of rubber, plastic, metal or wrappings of wire or thread.

6. The combination as set forth in claim 5, wherein said collar or securement is slideably fitted on said shank portion of said hook to allow adjustment of said protecting member.

* * * * *

UNITED STATES PATENT OFFICE
CERTIFICATE OF CORRECTION

Patent No. 3,670,446          Dated June 20, 1972

Inventor(s) Daniel B. Wheeler

It is certified that error appears in the above-identified patent and that said Letters Patent are hereby corrected as shown below:

Column 2, line 1, "not" should read -- now -- .

Signed and sealed this 2nd day of January 1973.

(SEAL)
Attest:

EDWARD M. FLETCHER, JR.
Attesting Officer

ROBERT GOTTSCHALK
Commissioner of Patents